US009668228B2

(12) United States Patent
Kim (10) Patent No.: US 9,668,228 B2
(45) Date of Patent: May 30, 2017

(54) METHODS FOR CONTROLLING TRANSMIT POWER AND ELECTRONIC DEVICES THEREOF

(71) Applicant: Samsung Electronics Co., Ltd., Gyeonggi-do (KR)

(72) Inventor: Jong-Yol Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 296 days.

(21) Appl. No.: 14/476,080

(22) Filed: Sep. 3, 2014

(65) Prior Publication Data

US 2015/0065120 A1 Mar. 5, 2015

(30) Foreign Application Priority Data

Sep. 3, 2013 (KR) .................. 10-2013-0105299

(51) Int. Cl.
*H04W 52/38* (2009.01)
*H04W 52/36* (2009.01)
*H04W 52/02* (2009.01)
*H04W 52/24* (2009.01)
*H04W 52/26* (2009.01)

(52) U.S. Cl.
CPC ..... *H04W 52/383* (2013.01); *H04W 52/0245* (2013.01); *H04W 52/247* (2013.01); *H04W 52/26* (2013.01); *H04W 52/367* (2013.01); *Y02B 60/50* (2013.01)

(58) Field of Classification Search
None
See application file for complete search history.

(56) References Cited

U.S. PATENT DOCUMENTS

| 2008/0165723 | A1  | 7/2008 | Kim |
|---|---|---|---|
| 2010/0180134 | A1  | 7/2010 | Kim |
| 2011/0105175 | A1* | 5/2011 | Wang .............. H04W 52/42 455/522 |
| 2015/0055563 | A1* | 2/2015 | Zhu ............... H04W 52/243 370/329 |

* cited by examiner

*Primary Examiner* — Olumide T Ajibade Akonai
*Assistant Examiner* — Margaret G Mastrodonato
(74) *Attorney, Agent, or Firm* — The Farrell Law Firm, P.C.

(57) ABSTRACT

Methods and apparatuses are provided for adjusting a transmit power at a first electronic device. A first Transmit Power Control (TPC) request message, including power mode information of the first electronic device, is transmitted from the first electronic device to a second electronic device. The first electronic device receives a first TPC report message, including power mode information of the second electronic device, transmit power information of the second electronic device, and link margin information for the first electronic device, from the second electronic device. The first electronic device adjusts the transmit power according to the power mode information of the second electronic device, using the transmit power information and the link margin information included in the first TPC report message.

16 Claims, 8 Drawing Sheets

FIG.8

METHODS FOR CONTROLLING TRANSMIT POWER AND ELECTRONIC DEVICES THEREOF

PRIORITY

This application claims priority under 35 U.S.C. §119(a) to an application filed in the Korean Intellectual Property Office on Sep. 3, 2013 and assigned Serial No. 10-2013-0105299, the contents of which are incorporated herein by reference.

BACKGROUND OF THE INVENTION

1. Field of the Invention

The present invention relates generally to a method for controlling transmit power of an electronic device, and more particularly, to a method and an apparatus for controlling the transmit power of an electronic device in a Peer-to-Peer (P2P) environment.

2. Description of the Related Art

Wireless communication systems provide various types of communication services including, for example, voice and data services. Generally, a wireless communication system or a network is capable of providing multiple-use access using one or more shared resources. For example, the system may use various types of multiple access technologies, such as, for example, Frequency Division Multiplexing (FDM), Time Division Multiplexing (TDM), Code Division Multiplexing (CDM), Orthogonal Frequency Division Multiplexing (OFDM), and the like.

A common wireless communication system uses one or more base stations, each providing a coverage area. A general base station may transmit multiple data streams for broadcast, multicast, and/or unicast services. A wireless terminal located within the coverage area of the base station may receive one, two, or all data streams delivered through a plurality of streams. Similarly, the wireless terminal may transmit data to a base station or another wireless terminal.

As another example, a wireless terminal is able to directly transmit data streams to another wireless terminal based on a P2P or ad-hoc architecture in a wireless communication system. As such, adjacent wireless terminals are able to directly communicate with each other, instead of delivering data streams through a base station.

Generally, there is a need for power control capable of resolving a problem caused by a difference in power of signals received by a base station according to a distance between a wireless terminal and a base station. There is also a need for power control capable of resolving a problem that different wireless terminals experience different fadings, and capable of maximizing subscriber capability. When the transmit power of the wireless terminal is low, the call quality of the wireless terminal is decreased. When the transmit power is high, the call quality is improved, but a large amount of interference is caused with respect to another wireless terminal that uses the same channel, causing the call quality of another subscriber to be poor. Therefore, the transmit powers of individual wireless terminals may be controlled such that received powers from individual terminals, which are received by a base station, are equal, and a signal to interference ratio is minimized in order to maintain good call quality for all subscribers and maximize capability.

Similarly, there is a need for Transmit Power Control (TPC) suitable for a P2P communication environment between wireless terminals that improves performance.

SUMMARY OF THE INVENTION

The present invention has been made to address at least the above problems and/or disadvantages and to provide at least the advantages described below. Accordingly, an aspect of the present invention provides a method and an apparatus for controlling transmit power of an electronic device in a P2P environment where individual devices are able to directly communicate with each other.

Another aspect of the present invention provides a method and an apparatus for minimizing current consumption upon WiFi direct communication in a wireless terminal.

According to an aspect of the present invention, a method is provided for adjusting a transmit power at a first electronic device. A first TPC request message, including power mode information of the first electronic device, is transmitted from the first electronic device to a second electronic device. The first electronic device receives a first TPC report message, including power mode information of the second electronic device, transmit power information of the second electronic device, and link margin information for the first electronic device, from the second electronic device. The first electronic device adjusts the transmit power according to the power mode information of the second electronic device, using the transmit power information and the link margin information included in the first TPC report message.

According to another aspect of the present invention, a method is provided for adjusting a transmit power at a second electronic device. The second electronic device receives a first TPC request message including power mode information of a first electronic device, from the first electronic device. The first electronic device transmits, to the first electronic device, a first TPC report message including power mode information of the second electronic device, transmit power information of the second electronic device, and link margin information for the first electronic device. The power mode information indicates one of a normal mode, a power saving mode, and a low power battery mode.

According to another aspect of the present invention, a first electronic device is provided that includes a transmission unit configured to transmit a first TPC request message, including power mode information of the first electronic device, to a second electronic device. The first electronic device also includes a reception unit configured to receive a first TPC report message including, power mode information of the second electronic device, transmit power information of the second electronic device, and link margin information for the first electronic device, from the second electronic device. The first electronic device further includes a control unit configured to adjust a transmit power according to the power mode information of the second electronic device, using the transmit power information and the link margin information included in the first TPC report message.

According to another aspect of the present invention, a second electronic device is provided that includes a reception unit configured to receive a first TPC request message, including power mode information of a first electronic device, from the first electronic device. The second electronic device also includes a transmission unit configured to transmit a first TPC report message including power mode information of the second electronic device, transmit power information of the second electronic device, and link margin information for the first electronic device, to the first electronic device. The power mode information indicates one of a normal mode, a power saving mode, and a low power battery mode.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF EMBODIMENTS OF THE PRESENT INVENTION

Embodiments of the present invention are described in detail below with reference to the accompanying drawings. The same or similar components may be designated by the same or similar reference numerals although they are illustrated in different drawings. Detailed descriptions of constructions or processes known in the art may be omitted to avoid obscuring the subject matter of the present invention. Also, the terms used herein are defined according to the functions of the present invention. Thus, the terms may vary depending on users' or operators' intentions or practices. Therefore, the terms used herein must be understood based on the descriptions made herein.

Embodiments of the present invention provide a method and an apparatus for controlling transmit power of an electronic device in a P2P communication environment where individual devices are able to directly communicate with each other.

Direct communication between devices may be implemented by using one of WiFi direct communication, Bluetooth® communication, and infrared communication.

Although embodiments of the present invention are described based on TPC proposed by the Institute of Electrical and Electronics Engineers (IEEE) 802.11h standard, embodiments of the present invention are not limited to IEEE 802.11h specification and may be applied to other standard protocols such as the IEEE 802.15 standard.

The IEEE 802.11h standard is an extension of the IEEE 802.11a standard and is only for a 5 GHz frequency band. The IEEE 802.11h standard provides definitions for a TPC protocol according to avoidance of interference with satellite signals and compliance of regulatory requirements in a regulatory domain. The IEEE 802.11h standard does not consider an approach for a limitation in a RF signal range between wireless terminals, which perform WiFi P2P communication with each other according to a battery state (normal mode, power saving mode, and low power battery mode).

Therefore, embodiments of the present invention provide an approach of controlling transmit power depending on a battery state of a wireless terminal.

Figure 1:
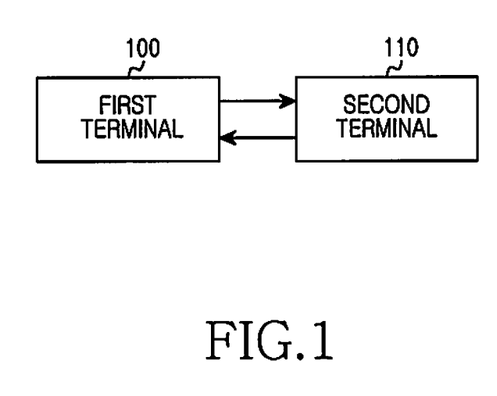
FIG. 1 is a diagram illustrating a P2P communication scenario between electronic devices, according to an embodiment of the present invention.

FIG. 1 is a diagram illustrating a P2P communication scenario between devices, according to an embodiment of the present invention.

Referring to FIG. 1, when a first terminal 100 and a second terminal 110 are adjacent to each other, they are able to directly communicate with each other without connection to a base station. For example, the first terminal 100 may directly transmit data to the second terminal 110 and directly receive data from the second terminal 110 by using, for example, WiFi direct communication, Bluetooth® communication, or infrared communication.

The first terminal 100 and the second terminal 110 may operate in one of two power management modes, which include an active mode (or a normal mode) and a power saving mode. The active mode refers to a mode in which a terminal maintains a wake-up state. The first terminal 100 and the second terminal 110 may switch between the wake-up state and a sleep state. In the wake-up state, a terminal is allowed to perform transmission and reception, and in the sleep state, the terminal is not allowed to perform transmission and reception, or is allowed to perform only minimum reception in order to prevent power consumption. The terminal may enter a mode in which a remaining battery power is not sufficient and a service duration time is minimal. The mode refers to a low power battery mode.

Hereinafter, the power saving mode is referred to as a first power mode, the low power battery mode is referred to as a second power mode, and the active mode (or the normal mode) is referred to as a third power mode.

Embodiments of the present invention provide a method of controlling transmit power in consideration of a power mode of a terminal during P2P communication.

Figure 4A:
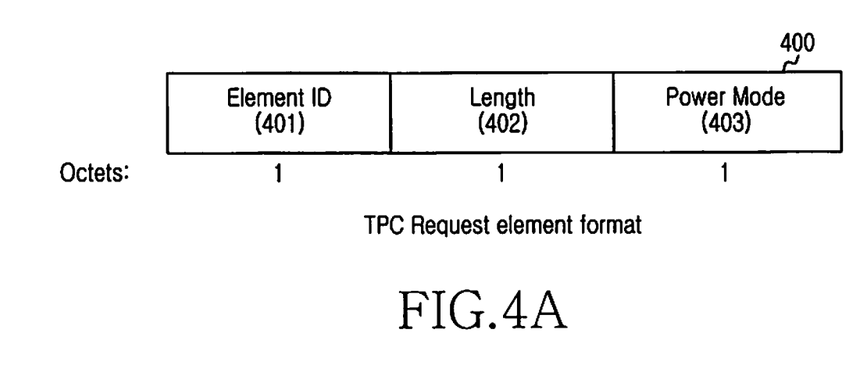
FIG. 4A illustrates a format of a TPC request message, according to an embodiment of the present invention.
Figure 4B:
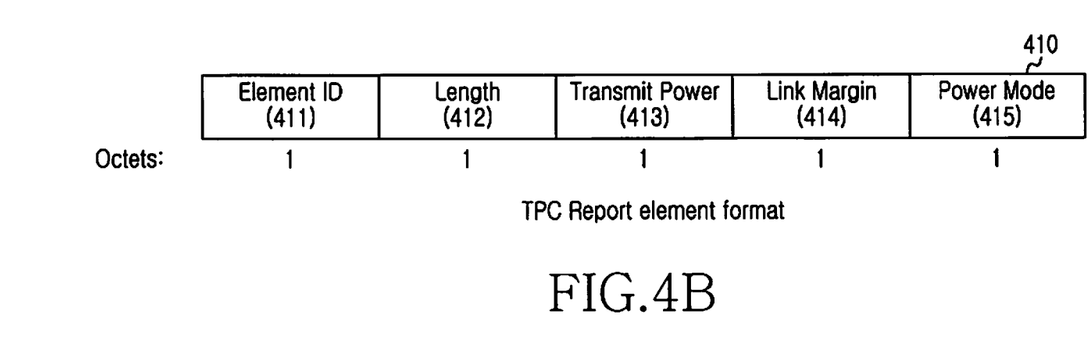
FIG. 4B illustrates a format of a TPC report message, according to an embodiment of the present invention.

Accordingly, there is a need to define a message format for provision of power mode information between terminals during P2P communication. Embodiments of the present invention define formats for a TPC request message and a TPC report message of IEEE 802.11h, as illustrated in FIGS. 4A and 4B below. The message formats are merely examples and message formats of other protocols may be used.

Figure 2:
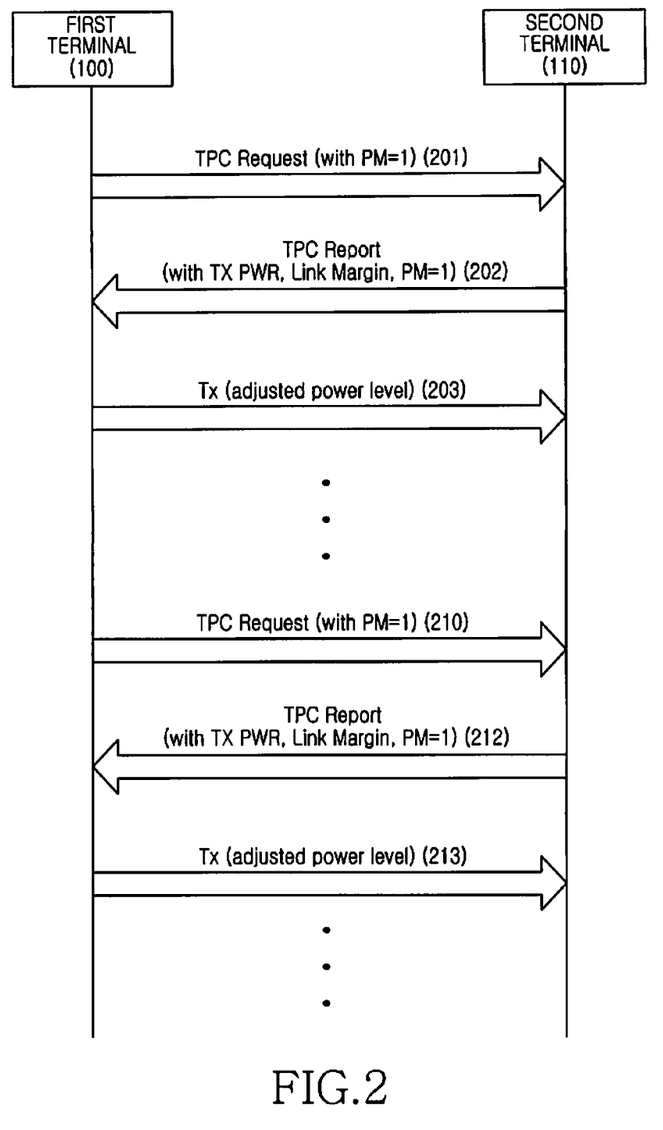
FIG. 2 is a diagram illustrating a signal flow for transmit power control in a power saving mode, according to an embodiment of the present invention.

FIG. 2 is a diagram illustrating a signal flow for transmit power control in a power saving mode, according to an embodiment of the present invention.

Referring to FIG. 2, in step 201, the first terminal 100 transmits a TPC request message including power mode information (for example, information (PM=1) indicating the power saving mode) to the second terminal 110, when a value indicating a power mode is "1", i.e., when the first terminal 100 enters the power saving mode.

In step 202, the second terminal 110 transmits a TPC report message to the first terminal 100 in response to the TPC request message from the first terminal 100.

The TPC report message may include a transmit power value of a frame in which the report information elements of the TPC report message are transmitted, a link margin determined by a ratio of an expected transmit power value of the first terminal 100 to an actual received power value when reception is performed by the second terminal 110, and the power mode information of the second terminal 110. The power mode information of the second terminal 110 is information indicating that a current power mode of the second terminal 110 is identical to the power mode information of the first terminal 100 included in the TPC request message, or information indicating that the second terminal 110 switches to the power mode of the first terminal 100. In order words, the second terminal 110 may determine whether the second terminal 110 is allowed to enter the power mode (for example, power saving mode) of the first terminal 100, and inform the first terminal 100 of a result of the determination. Therefore, the power mode of the second terminal 110 may be synchronized with the power mode of the first terminal 100. When the second terminal 110 is not allowed to switch to the power mode identical to that of the first terminal 100, the second terminal 110 transmits its own power mode information to guide the first terminal 100 to switch to the power mode of the second terminal 110.

In step 203, the first terminal 100 adjusts a transmit power in consideration of the transmit power value and link margin information of the TPC report message.

When the link margin of the TPC report message does not satisfy a predefined link margin, the first terminal 100 transmits a TPC request message including power mode information to the second terminal 110 at a transmit power level that is one step lower than (or higher than) a previous transmit power level, in step 210. In step 212, the second terminal 110 transmits a TPC report message to the first terminal 100 in response to the TPC request message from the first terminal 100. In step 213, the first terminal 100 adjusts a transmit power in consideration of the transmit power value and the link margin information of the TPC report message.

In another embodiment of the present invention, when the link margin of the TPC report message does not satisfy the predefined link margin, the second terminal 110 transmits a TPC request message including power mode information to the first terminal 100 at a transmit power level one step lower than (or higher than) a previous transmit power level. In this case, the first terminal 100 transmits a TPC report message to the second terminal 110 in response to the TPC request message from the second terminal 110. The second terminal 110 adjusts a transmit power in consideration of the transmit power value and the link margin information of the TPC report message.

Steps 201, 202, 210 and 212 of transmitting the TPC request message and the TPC report message are repeatedly performed such that a transmit power is gradually decreased until a predefined link margin is secured, thereby performing transmission at a finally adjusted power level.

Figure 3:
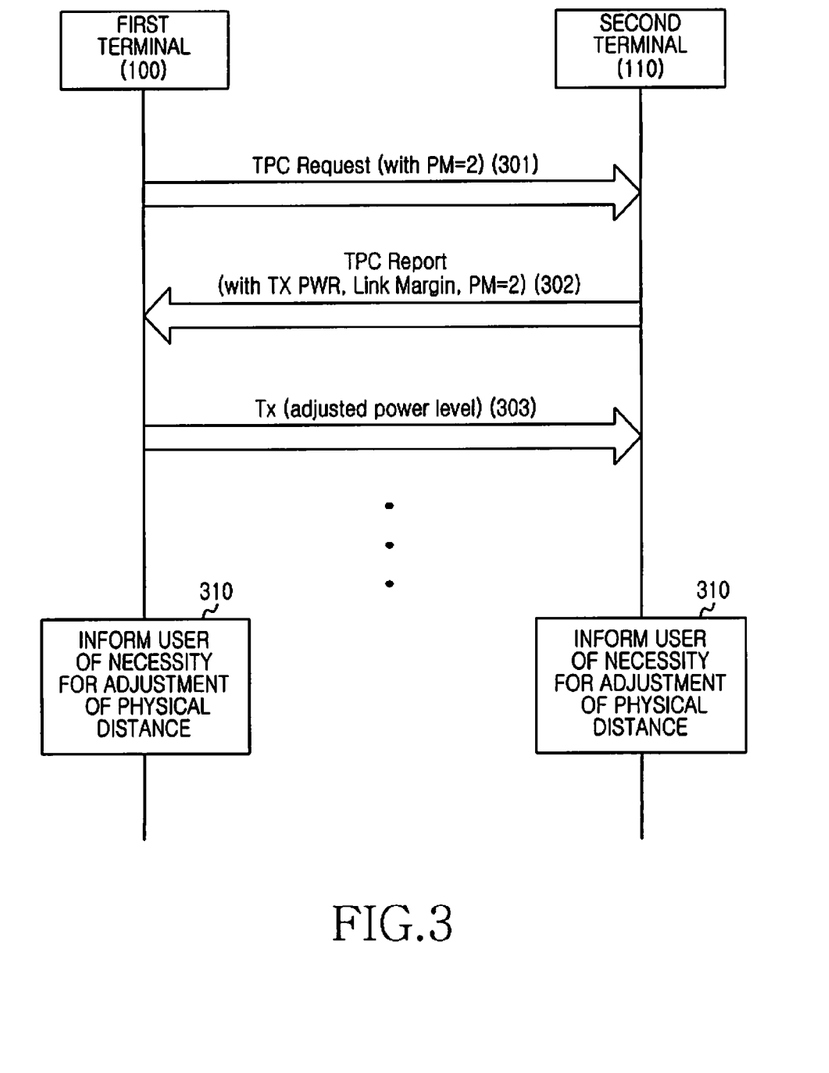
FIG. 3 is a diagram illustrating a signal flow for transmit power control in a low power battery mode, according to an embodiment of the present invention.

FIG. 3 is a diagram illustrating a signal flow for transmit power control in a low power battery mode, according to an embodiment of the present invention.

Referring to FIG. 3, in step 301, the first terminal 100 transmits a TPC request message including power mode information (for example, information (PM=2) indicating the low power battery mode) to the second terminal 110, when a value indicating a power mode is "2", that is, when the first terminal 100 enters the low power battery mode.

In step 302, the second terminal 110 transmits a TPC report message to the first terminal 100 in response to the TPC request message from the first terminal 100. The TPC report message includes the elements described above with respect to FIG. 2.

The transmit power of the TPC report message has a level lower than a transmit power set in a power saving mode, and is a minimum transmit power corresponding to a predefined minimum link margin Therefore, the terminal maximizes a service duration time even when entering the low power battery mode.

In step 303, the first terminal 100 adjusts a transmit power in consideration of the transmit power value and the link margin information of the TPC report message.

In the power saving mode described with reference to FIG. 2, a transmit power is adjusted by decreasing the transmit power gradually by one step until the predefined link margin is satisfied. In the low power battery mode, the transmit power is adjusted to be a predefined minimum transmit power without consideration of the link margin.

When a link margin is not secured and services are out of service upon adjustment to a predefined minimum transmit power, the first terminal 100 and the second terminal 110 may inform users, through a user interface (for example, a popup window), that a physical distance between the two terminals needs to be reduced. That is, it is possible to guide the two terminals to reduce the physical distance between the two terminals so as to secure the minimum link margin.

Although not illustrated, a new terminal is restricted so as not to be added to the first terminal 100 or the second terminal 110 in the low power battery mode.

FIG. 4A is a diagram illustrating a format of a TPC request message, according to an embodiment of the present invention.

Referring to FIG. 4A, information elements of a TPC request message 400 include an information-element identifier field 401, a length field 402, and a power mode field 403. The identifier field 401 includes information for identifying a relevant information element, the length field 402 includes information on the length of the TPC request message 400, and the power mode field 404 includes information on the power mode of a terminal.

FIG. 4B is a diagram illustrating a format of a TPC report message, according to an embodiment of the present invention.

Referring to FIG. 4B, information elements of a TPC report message 410 include an information-element identifier field 411, a length field 412, a transmit power field 413, a link margin field 414, and a power mode field 415. The identifier field 411 includes information for identifying a relevant information element, the length field 412 includes the length of the TPC report message 410, and the transmit power field 413 includes a transmit power value of a frame in which the report information elements of the TPC report message are transmitted. The link margin field 414 indicates a reserved amount for preventing a link transmission performance from being lower than a reference, and is determined by a ratio of an expected transmit power value of the TPC request message to an actual received power value. The power mode field 415 includes information on the power mode of a terminal.

Figure 5:
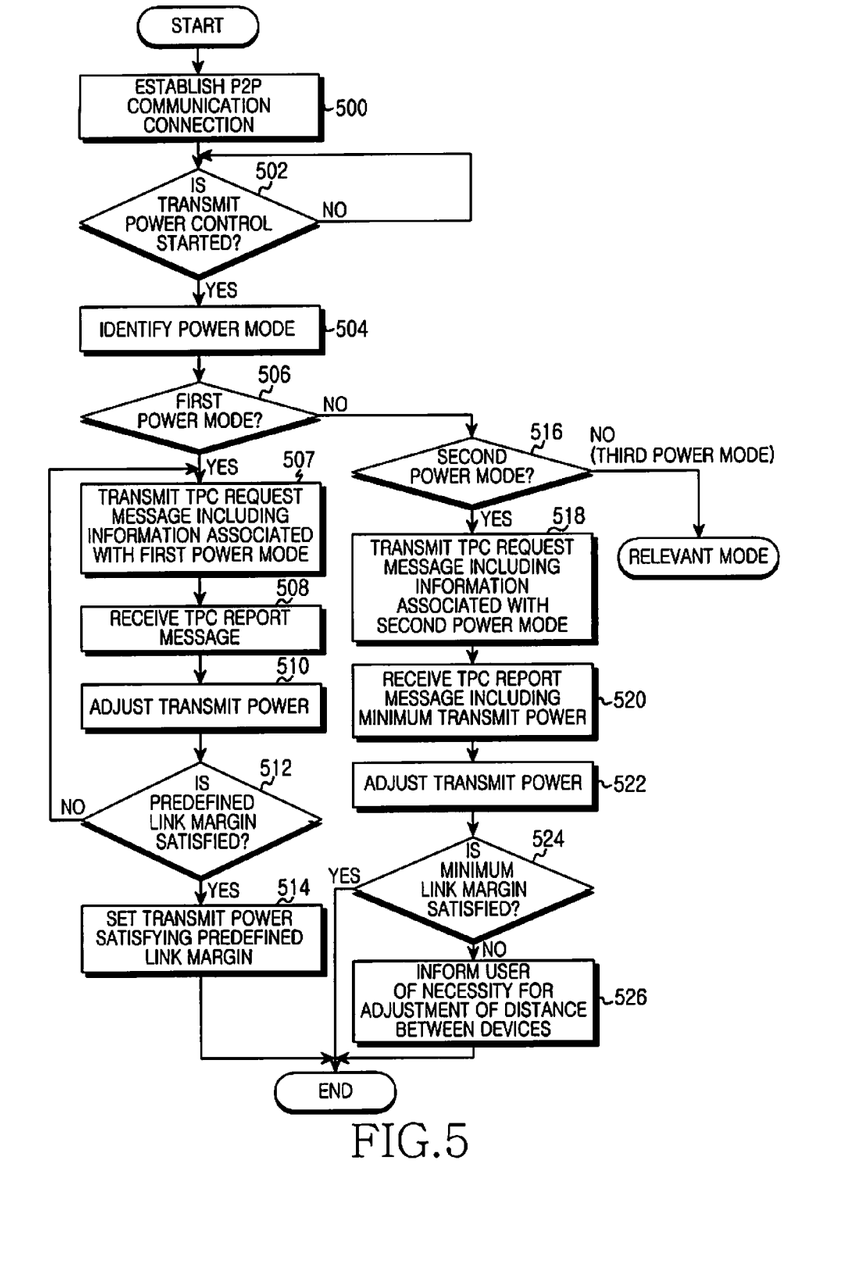
FIG. 5 is a flowchart illustrating operation of a first electronic device for transmit power control, according to an embodiment of the present invention.

FIG. 5 is a flowchart illustrating operation of a first electronic device for transmit power control, according to an embodiment of the present invention.

Referring to FIG. 5, the first electronic device establishes a P2P communication connection with a second electronic device, in step 500. A method for establishing a P2P communication connection may be performed by using one of Bluetooth® communication, WiFi direct communication, and infrared communication.

In step 502, it is determined whether transmit power control is started. When transmit power control is started, the first electronic device identifies a power mode, in step 504. The power mode of the first electronic device may be one of a normal mode, a power saving mode, and a low power battery mode. According to various embodiments, those skilled in the art may perform subdivision on the power mode in addition to the power saving mode, the low power battery mode and the normal mode.

In step 506, it is determined whether the power mode of the first electronic device is a first power mode, i.e., the power saving mode. When the power mode of the first electronic device is the first power mode, the first electronic device transmits a TPC request message including information (for example, information indicating that the first electronic device is in the power saving mode) associated with the first power mode to the second electronic device, in step 507.

In step 508, the first electronic device receives a TPC report message including a transmit power value of the TPC report message transmitted by the second electronic device, a link margin, and information about a power mode of the second electronic device from the second electronic device.

In step 510, the first electronic device adjusts a transmit power in consideration of a transmit power value of the TPC report message transmitted by the second electronic device, a link margin and a power mode of the second electronic device.

In step 512, it is determined whether the adjusted transmit power satisfies a predefined link margin. When the adjusted transmit power does not satisfy the predefined link margin, the first electronic device repeatedly performs step 507, step 508, and step 510 until the adjusted transmit power satisfies the predefined link margin. When the adjusted transmit power satisfies the predefined link margin, the first electronic device sets the transmit power that satisfies the predefined link margin, in step 514. That is, the first electronic device gradually decreases the transmit power and determines the transmit power that satisfies the link margin in the first power mode, or gradually increases the transmit power and determines the transmit power that satisfies the link margin in the first power mode.

Referring back to step 506, when it is determined that the first electronic device is not in the first power mode, the first electronic device determines whether the first electronic device is in a second power mode, i.e., the low power battery mode, in step 516.

When it is determined that the power mode of the first electronic device is the second power mode, the first electronic device transmits a TPC request message including information (for example, information indicating that the first electronic device is in the low power battery mode) associated with the second power mode to the second electronic device, in step 518.

In step 520, the first electronic device receives a TPC report message including a transmit power value of the TPC report message transmitted by the second electronic device, a link margin, and information about a power mode of the second electronic device from the second electronic device. In this case, the transmit power value is a minimum transmit power value and may be smaller than the transmit power value determined in the first power mode.

In step 522, the first electronic device adjusts a transmit power in consideration of a transmit power value of the TPC report message transmitted by the second electronic device, a link margin, and information about a power mode of the second electronic device.

In step 524, the first electronic device determines whether a minimum link margin is satisfied. When the minimum link margin is not satisfied, the first electronic device informs a user that the distance between the first electronic device and the second electronic device must be adjusted to secure the minimum link margin, in step 526.

Referring back to step 516, when it is determined that the power mode of the first electronic device is not the second power mode, i.e., the power mode of the first electronic device is a normal mode, the first electronic device operates in the relevant mode. For example, the first electronic device may perform P2P direct communication with the second electronic device at a predefined maximum transmit power in the normal mode.

Figure 6:
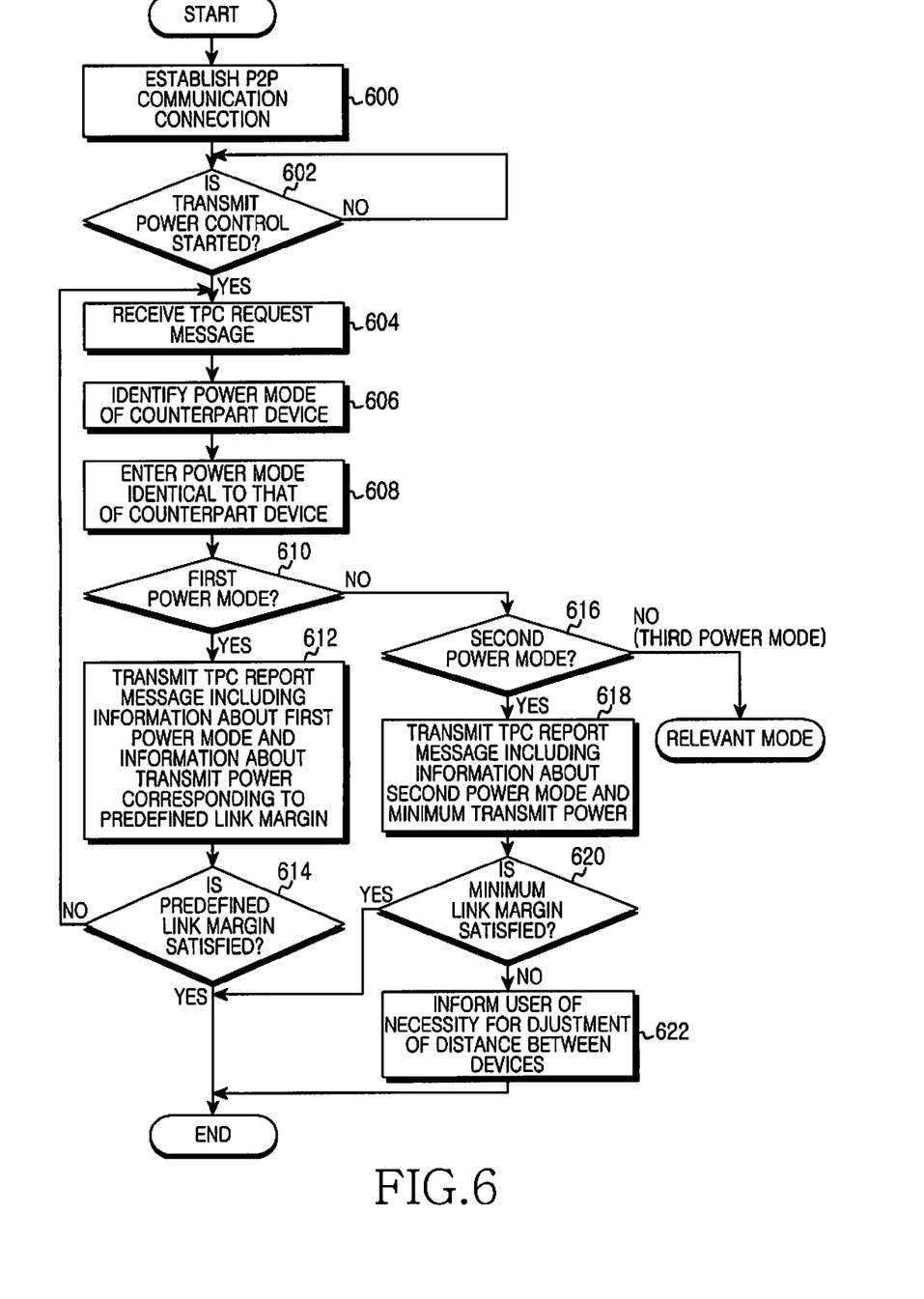
FIG. 6 is a flowchart illustrating operation of a second electronic device for transmit power control, according to an embodiment of the present invention.

FIG. 6 is a flowchart illustrating operation of a second electronic device for transmit power control, according to an embodiment of the present invention.

Referring to FIG. 6, the second electronic device establishes a P2P communication connection with a first electronic device, in step 600. A method for establishing a P2P communication connection may be performed by using one of Bluetooth® communication, WiFi direct communication, and infrared communication.

In step 602, it is determined whether transmit power control is started. When transmit power control is started, the second electronic device receives a TPC request message, including information associated with the power mode of the first electronic device, from the first electronic device, in step 604.

The second electronic device identifies the power mode of the first electronic device, in step 606, and sets the power mode thereof to be identical to the power mode of the first electronic device, in step 608. When the second electronic device is not allowed to enter the power mode identical to that of the first electronic device, the second electronic device may maintain an allowable power mode.

In step 610 it is determined whether a first power mode is set. When the first power mode is set, the second electronic device transmits a TPC report message, including a transmit power value of the TPC report message transmitted by the second electronic device, a link margin, and information about the first power mode, to the first electronic device, in step 612.

In step 614, it is determined whether an adjusted transmit power satisfies a predefined link margin. When the adjusted transmit power does not satisfy the predefined link margin, the second electronic device repeatedly performs step 604, step 606, step 608, step 610, and step 612 until the adjusted transmit power satisfies the predefined link margin. That is, the electronic device gradually decreases the transmit power and determines the transmit power that satisfies a link margin in the first power mode, or gradually increases the transmit power and determines the transmit power that satisfies the link margin in the second power mode.

Referring back to step 610, when the power mode of second electronic device is not the first power mode, the second electronic device determines whether the second electronic device is in a second power mode, in step 616.

When the power mode of the second electronic device is the second power mode, that is, the low power battery mode, the second electronic device transmits a TPC report message, including a transmit power value of the TPC report message transmitted by the second electronic device, a link margin, and information about the power mode of the second electronic device, to the first electronic device, in step 618. In this case, the transmit power value is a minimum transmit power value and may be smaller than the transmit power value determined in the first power mode.

The second electronic device determines whether a minimum link margin is satisfied, in step 620. When the minimum link margin is not satisfied, the first electronic device informs a user that the distance between the first electronic device and the second electronic device must be adjusted to satisfy the minimum link margin, in step 622.

Referring back to step 616, when the power mode of the second electronic device is not the second power mode, that is, the power mode of the second electronic device is a normal mode, the second electronic device operates in the normal mode. For example, the second electronic device may perform P2P direct communication with the first electronic device at a predefined maximum transmit power in the normal mode.

Figure 7:
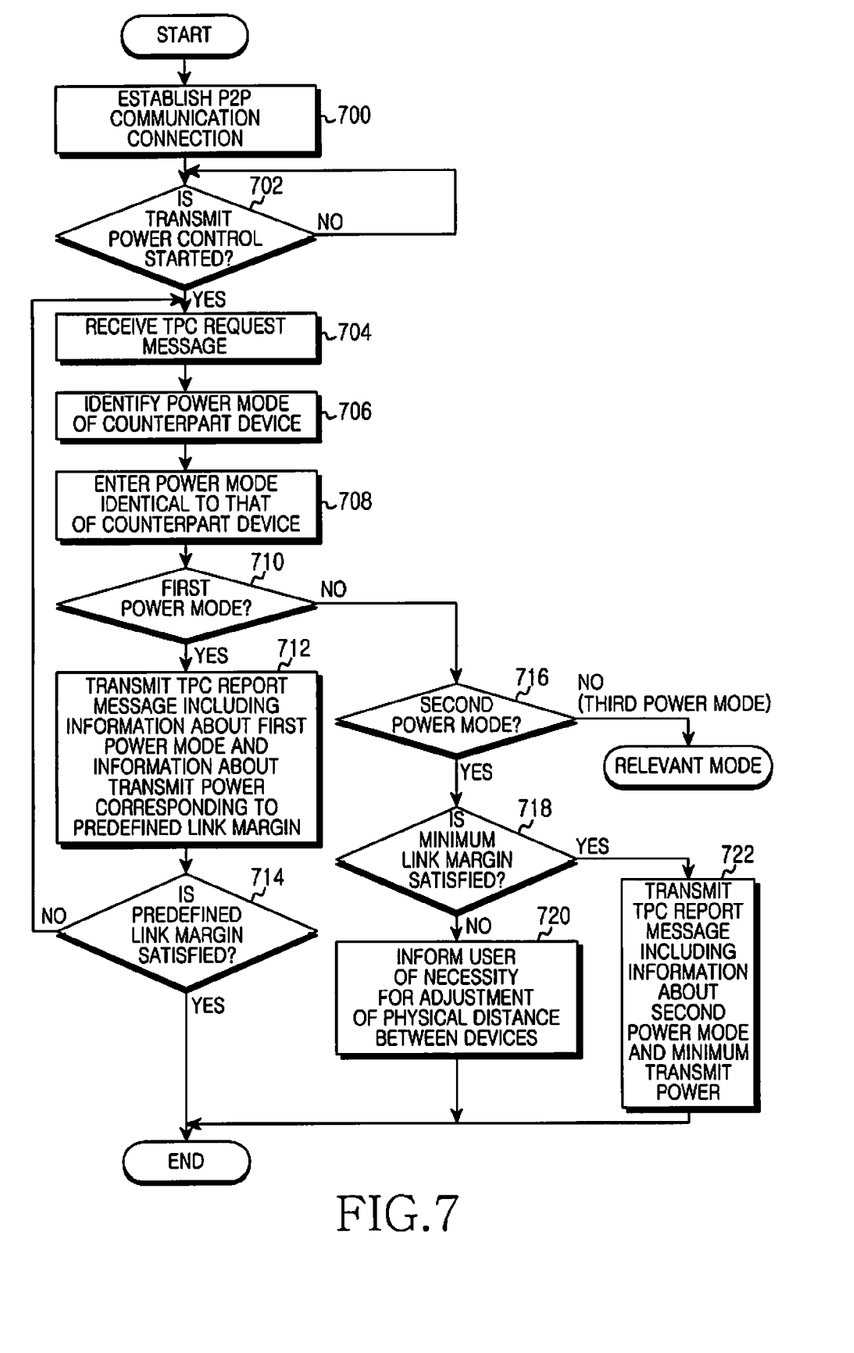
FIG. 7 is a flowchart illustrating operation of a second electronic device for transmit power control, according to another embodiment of the present invention.

FIG. 7 is a flowchart illustrating operation of a second electronic device for transmit power control, according to another embodiment of the present invention.

Referring to FIG. 7, steps 700, 702, 704, 706, 708, 710, 712, 714, and 716 are identical to steps 600, 602, 604, 606, 608, 610, 612, 614, and 616, respectively, described above with respect to FIG. 6.

Referring to step 716, when it is determined that the power mode of the second electronic device is a second power mode, that is, a low power battery mode, the second electronic device determines whether a minimum link margin is satisfied, in step 718. When the minimum link margin is not satisfied, the second electronic device informs a user that a distance between the first electronic device and the second electronic device must be adjusted to satisfy the minimum link margin, in step 720. Referring back to step 718, when it is determined that the minimum link margin is satisfied, the second electronic device transmits a TPC report message, including a transmit power value of the TPC report message transmitted by the second electronic device, a link margin, and information about the power mode of the second electronic device, to the first electronic device, in step 722. In this case, the transmit power value is a minimum transmit power value and may be smaller than the transmit power value determined in the first power mode.

Referring back to step 716, when the power mode of the second electronic device is not the second power mode, that is, is a normal mode, the second electronic device operates in the normal mode. For example, the second electronic device may perform P2P direct communication with the first electronic device at a predefined maximum transmit power in the normal mode.

Figure 8:
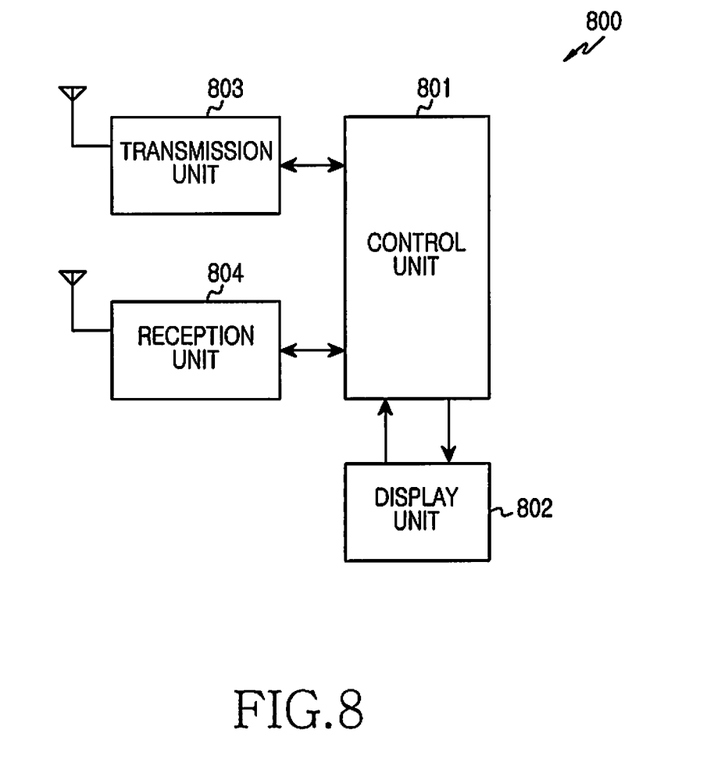
FIG. 8 illustrates a configuration diagram of an electronic device for transmit power control, according to an embodiment of the present invention.

FIG. 8 is a diagram illustrating an electronic device for transmit power control, according to an embodiment of the present invention.

The electronic devices 100 and 110 may be embodied as, for example, a portable terminal, a mobile terminal, a mobile pad, a media player, a tablet computer, a handheld computer, a Personal Digital Assistant (PDA), a server, or a personal computer. In addition, the electronic device may include a device having two or more functions among the above-described devices.

Referring to FIG. 8, an electronic device 800 includes a control unit 801, a display unit 802, a transmission unit 803, and a reception unit 804. The above-described components of the electronic device 800 are considered to merely describe an embodiment of the present invention, and additional components, such as, for example, a speaker, a microphone, a camera module, a Global Positioning System (GPS) receiver, and a sensor module, may be also included in the electronic device 800.

The control unit 800 may include one or more processors and an internal memory. The control unit 800 may also be referred to as a processor.

The control unit 800 may execute various software programs to perform various functions for the electronic device 800, and may perform processes and controls for voice communication and data communication. In addition to these general functions, the control unit 800 executes a specific software module (i.e., an instruction set) stored in an external memory or the internal memory to perform various specific functions corresponding to the software module. That is, the control unit 800 may perform methods of controlling transmit power of the electronic device 800 in cooperation with software modules stored in a memory, according to various embodiments of the present invention described above with respect to FIGS. 5-7, in a P2P communication environment where individual devices are able to directly communicate with each other.

The transmission unit 803 and the reception unit 804 perform communication functions. For example, the transmission unit 803 and the reception unit 804 convert RF signals into baseband signals under the control of the control unit 800 and provide the same to the control unit 800, or convert baseband signals from the control unit 800 into RF signals and provide the same. The control unit 800 processes baseband signals according to various communication methods. For example, the communication methods may include, but are not limited to, a Global System for Mobile (GSM) communication method, an Enhanced Data GSM Environment (EDGE) communication method, a Code Division Multiple Access (CDMA) communication method, a Wideband-Code Division Multiple Access (W-CDMA) communication method, a Long Term Evolution (LTE) communication method, an Orthogonal Frequency Division Multiple Access (OFDMA) communication method, a WiFi communication method, a WiMax network, a Bluetooth® communication method, or/and an infrared communication method.

The display unit 802 provides an I/O interface between the electronic device 801 and the user. That is, the display unit 802 provides a touch input of the user to the electronic device. Also, the display unit 802 is a medium that displays an output from the electronic device 800 to the user. That is, the display unit 802 displays a visual output to the user. The visual output may be represented by a text, a graphic, a video, or a combination thereof.

The display unit 802 may be implemented by various displays. For example, the display unit 802 may be implemented by, but is not limited to, a Liquid Crystal Display (LCD), a Light Emitting Diode (LED) display, a Light emitting Polymer Display (LPD), an Organic Light Emitting Diode (OLED) display, an Active Matrix Organic Light Emitting Diode (AMOLED) display, or a Flexible LED (FLED) display.

The methods according to the embodiments of the present invention may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device. The one or more programs may include instructions for causing the electronic device to execute the methods according to the embodiments of the present invention.

These programs (software modules, software) may be stored in a Random Access Memory (RAM), a non-volatile memory including a flash memory, Read Only Memory (ROM), an Electrically Erasable Programmable Read Only Memory (EEPROM), a magnetic disc storage device, a Compact Disc (CD)-ROM, Digital Versatile Discs (DVDs), or other types of optical storage devices, and a magnetic cassette. Alternatively, these programs can be stored in a memory configured using a combination of some or all of these. Also, a plurality of configured memories may be included.

Also, these programs can be stored in an attachable storage device that can access the electronic device via a communication network such as the Internet, Intranet, Local Area Network (LAN), Wireless LAN (WLAN), and a Storage Area Network (SAN), or a communication network configured using combination of these. This storage device can access the electronic device via an external port.

Also, a separate storage device on a communication network can access a portable electronic device.

As described above, a transmit power is adjusted according to a power mode of an electronic device, thereby minimizing current consumption during P2P communication and reducing battery consumption of the electronic device.

In the low power battery mode, the electronic device informs a user of a necessity for distance adjustment, thereby increasing service time while maintaining utility and performance.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for adjusting a transmit power at a first electronic device, the method comprising the steps of:
    transmitting a first Transmit Power Control (TPC) request message, including power mode information of the first electronic device, from the first electronic device to a second electronic device;
    receiving, at the first electronic device, a first TPC report message, including power mode information of the second electronic device, transmit power information of the second electronic device, and link margin information for the first electronic device, from the second electronic device;
    adjusting, at the first electronic device, the transmit power according to the power mode information of the second electronic device, using the transmit power information and the link margin information included in the first TPC report message; and
    upon a power mode of the first electronic device being a low power battery mode,
    determining whether a predefined link margin is satisfied if a minimum transmit rower is set, and
    informing a user that a distance between the first electronic device and the second electronic device must be adjusted if the predefined link margin is not satisfied.

2. The method of claim 1, wherein the power mode information of the first electronic device and the power mode information of the second electronic device are each one of a normal mode, a power saving mode, and a low power battery mode.

3. The method of claim 1, further comprising:
    transmitting, from the first electronic device, to the second electronic device, a second TPC request message including the power mode information of the first electronic device, when a power mode of the first electronic device is a power saving mode and the link margin information included in the first TPC report message does not satisfy a predefined link margin;
    receiving, at the first electronic device, from the second electronic device, a second TPC report message including the power mode information of the second electronic device, the transmit power information of the second electronic device, and the link margin information for the first electronic device; and
    adjusting the transmit power according to the power mode information of the second electronic device using the transmit power information and the link margin information included in the second TPC report message.

4. The method of claim 1, further comprising:
    receiving, at the first electronic device, a second TPC request message, including the power mode information of the second electronic device, from the second electronic device, when a power mode of the first electronic device is a power saving mode and the link margin information included in the first TPC report message does not satisfy a predefined link margin; and
    transmitting, from the first electronic device, to the second electronic device, a second TPC report message including the power mode information of the first electronic device, transmit power information of the first electronic device, and link margin information of the second electronic device.

5. The method of claim 1, wherein a power mode of the first electronic device is identical to a power mode of the second electronic device.

6. A method for adjusting a transmit power at a second electronic device, the method comprising the steps of:
    receiving, at the second electronic device, a first Transmit Power Control (TPC) request message including power mode information of a first electronic device, from the first electronic device;
    transmitting, from the second electronic device, to the first electronic device, a first TPC report message including power mode information of the second electronic device, transmit power information of the second electronic device, and link margin information for the first electronic device; and
    upon a power mode of the first electronic device being a low power battery mode,
    determining whether a predefined link margin is satisfied if a minimum transmit power is set, and
    informing a user that a distance between the first electronic device and the second electronic device must be adjusted if the predefined link margin is not satisfied,
    wherein the power mode information indicates one of a normal mode, a power saving mode, and a low power battery mode.

7. The method of claim 6, further comprising:
    receiving, at the second electronic device, a second TPC request message including the power mode information of the first electronic device, from the first electronic device, when a power mode of the first electronic device is a power saving mode and the link margin information included in the first TPC report message does not satisfy a predefined link margin; and
    transmitting, from the second electronic device, to the first electronic device, a second TPC report message including the power mode information of the second electronic device, the transmit power information of the second electronic device, and the link margin information for the first electronic device.

8. The method of claim 6, further comprising:
transmitting, from the second electronic device, a second TPC request message including the power mode information of the second electronic device, to the first electronic device, when a power mode of the first electronic device is a power saving mode and the link margin information included in the first TPC report message does not satisfy a predefined link margin;
receiving, at the second electronic device, from the first electronic device, a second TPC report message including the power mode information of the first electronic device, transmit power information of the first electronic device, and link margin information for the second electronic device; and
adjusting the transmit power according to the power mode information of the first electronic device using the transmit power information and the link margin information included in the second TPC report message.

9. A first electronic device, comprising:
a transmission unit configured to transmit a first Transmit Power Control (TPC) request message, including power mode information of the first electronic device, to a second electronic device;
a reception unit configured to receive a first TPC report message including, power mode information of the second electronic device, transmit power information of the second electronic device, and link margin information for the first electronic device, from the second electronic device; and
a control unit configured to adjust a transmit power according to the power mode information of the second electronic device, using the transmit power information and the link margin information included in the first TPC report message, and upon a power mode of the first electronic device being a low power battery mode, determine whether a predefined link margin is satisfied if a minimum transmit power is set, and inform a user that a distance between the first electronic device and the second electronic device must be adjusted if the predefined link margin is not satisfied.

10. The first electronic device of claim 9, wherein the power mode information of the first electronic device and the power mode information of the second electronic device are each one of a normal mode, a power saving mode, and a low power battery mode.

11. The first electronic device of claim 9, wherein:
the transmission unit is further configured to transmit a second TPC request message, including the power mode information of the first electronic device, to the second electronic device, when a power mode of the first electronic device is a power saving mode and the link margin information included in the first TPC report message does not satisfy a predefined link margin,
the reception unit is further configured to receive a second TPC report message including the power mode information of the second electronic device, the transmit power information of the second electronic device, and the link margin information for the first electronic device, from the second electronic device, and
the control unit is further configured to adjust the transmit power according to the power mode information of the second electronic device, using the transmit power information and the link margin information included in the second TPC report message.

12. The first electronic device of claim 9, wherein:
the reception unit is further configured to receive a second TPC request message, including the power mode information of the second electronic device, from the second electronic device, when a power mode of the first electronic device is a power saving mode and the link margin information included in the TPC report message does not satisfy a predefined link margin, and
the transmission unit is further configured to transmit a second TPC report message including the power mode information of the first electronic device, transmit power information of the first electronic device, and link margin information for the second electronic device, to the second electronic device.

13. The first electronic device of claim 9, wherein a power mode of the first electronic device is identical to a power mode of the second electronic device.

14. A second electronic device, comprising:
a reception unit configured to receive a first Transmit Power Control (TPC) request message, including power mode information of a first electronic device, from the first electronic device;
a transmission unit configured to transmit a first TPC report message including power mode information of the second electronic device, transmit power information of the second electronic device, and link margin information for the first electronic device, to the first electronic device; and
a control unit configured to, upon a power mode of the first electronic device being a low power battery mode, determine whether a predefined link margin is satisfied if a minimum transmit power is set, and inform a user that a distance between the first electronic device and the second electronic device must be adjusted if the predefined link margin is not satisfied,
wherein the power mode information indicates one of a normal mode, a power saving mode, and a low power battery mode.

15. The second electronic device of claim 14, wherein:
the reception unit is further configured to receive a second TPC request message, including the power mode information of the first electronic device, from the first electronic device, when a power mode of the first electronic device is a power saving mode and the link margin information included in the TPC report message does not satisfy a predefined link margin, and
the transmission unit is further configured to transmit a second TPC report message including the power mode information of the second electronic device, the transmit power information of the second electronic device, and the link margin information for the first electronic device, to the first electronic device.

16. The second electronic device of claim 14,
wherein the transmission unit is further configured to transmit a second TPC request message, including the power mode information of the second electronic device, to the first electronic device, when a power mode of the first electronic device is a power saving mode and the link margin information included in the TPC report message does not satisfy a predefined link margin, and
wherein the reception unit is further configured to receive a second TPC report message including the power mode information of the first electronic device, transmit power information of the first electronic device, and link margin information for the second electronic device, from the first electronic, and
further comprising a control unit configured to adjust a transmit power according to the power mode information of the first electronic device, using the transmit power information and the link margin information included in the second TPC report message.

\* \* \* \* \*